(12) United States Patent
Mcintyre et al.

(10) Patent No.: US 10,933,446 B2
(45) Date of Patent: Mar. 2, 2021

(54) CONVEYOR SYSTEM AND ARTICLE CARRIERS THEREFOR

(71) Applicant: Compac Technologies Limited, Hamilton (NZ)

(72) Inventors: Andrew David Mcintyre, Hamilton (NZ); Hamish Alexander Nigel Kennedy, Hamilton (NZ); Kevin Lo, Hamilton (NZ)

(73) Assignee: COMPAC TECHNOLOGIES LIMITED, Hamilton (NZ)

( * ) Notice: Subject to any disclaimer, the term of this patent is extended or adjusted under 35 U.S.C. 154(b) by 0 days.

(21) Appl. No.: 16/313,256

(22) PCT Filed: Jun. 30, 2017

(86) PCT No.: PCT/NZ2017/050090
§ 371 (c)(1),
(2) Date: Dec. 26, 2018

(87) PCT Pub. No.: WO2018/004362
PCT Pub. Date: Jan. 4, 2018

(65) Prior Publication Data
US 2019/0151903 A1 May 23, 2019

(30) Foreign Application Priority Data
Jul. 1, 2016 (NZ) ........................ 721801

(51) Int. Cl.
*B07C 5/22* (2006.01)
*B65G 17/16* (2006.01)
(Continued)

(52) U.S. Cl.
CPC .................. *B07C 5/22* (2013.01); *B07C 5/16* (2013.01); *B07C 5/36* (2013.01); *B65G 17/16* (2013.01);
(Continued)

(58) Field of Classification Search
CPC ................ B65G 47/962; B65G 47/965; B65G 2201/0211; B65G 47/38; B65G 47/40;
(Continued)

(56) References Cited

U.S. PATENT DOCUMENTS 4,403,669 A 9/1983 Raz
4,413,690 A 11/1983 Peterson
(Continued)

FOREIGN PATENT DOCUMENTS

WO 2004067417 A1 8/2004
WO 2014073987 A1 5/2014

*Primary Examiner* — James R Bidwell
(74) *Attorney, Agent, or Firm* — Gable Gotwals (57) ABSTRACT

An article carrier is disclosed. The article carrier comprises a mounting portion adapted for connection to a conveyor such that when the article carrier is connected to the conveyor the conveyor is positioned on a conveyor axis of the article carrier. The article carrier has first and second carrier portions connected to the mounting portion which are configured to allow weighing of one or more articles carried, in use, by the carrier portions. The first carrier portion comprises a first bearing surface and a second bearing surface, and the second carrier portion comprises a third bearing surface and a spaced apart fourth bearing surface. A distance between the conveyor axis and any point on one of the bearing surfaces, measured orthogonally to the conveyor axis, is different to a distance between the conveyor axis and any point on any of the other bearing surfaces, measured orthogonally to the conveyor axis.

10 Claims, 12 Drawing Sheets

(51) Int. Cl.
   *B07C 5/36* (2006.01)
   *B65G 47/96* (2006.01)
   *B07C 5/16* (2006.01)

(52) U.S. Cl.
   CPC ...... *B65G 47/965* (2013.01); *B07C 2501/009* (2013.01)

(58) Field of Classification Search
   CPC .......... B65G 47/96; B65G 17/16; B07C 5/16; B07C 5/22; B07C 5/36; B07C 2501/009; B07B 13/16; B07B 13/08
   USPC .................................................. 198/370.04
   See application file for complete search history.

(56) References Cited

U.S. PATENT DOCUMENTS

| | | | |
|---|---|---|---|
| 4,660,665 A | | 4/1987 | Powell, Jr. |
| 4,711,344 A | | 12/1987 | Altenpohl |
| 4,770,260 A | | 9/1988 | Brook |
| 5,230,394 A | | 7/1993 | Blanc |
| 6,003,653 A | * | 12/1999 | Kennedy ................ B65G 47/96 177/145 |
| 6,079,542 A | * | 6/2000 | Blood ...................... B07C 5/342 198/370.05 |
| 6,092,640 A | * | 7/2000 | Kennedy ................ B65G 47/96 198/367 |
| 6,374,983 B1 | | 4/2002 | Morigi |
| 9,527,113 B2 | * | 12/2016 | Kennedy ................ B07B 13/16 |
| 2011/0309004 A1 | | 12/2011 | Morley |
| 2015/0298175 A1 | * | 10/2015 | Kennedy ................ B07B 13/08 198/370.03 |

* cited by examiner

CONVEYOR SYSTEM AND ARTICLE CARRIERS THEREFOR

CROSS-REFERENCE TO RELATED APPLICATIONS

This United States application is the National Phase of PCT Application No. PCT/NZ2017/050090 filed 30 Jun. 2017, which claims priority to New Zealand Patent Application No. 721801 filed 1 Jul. 2016, each of which is incorporated herein by reference.

BACKGROUND OF THE INVENTION

Technical Field

The present invention relates to a conveyor system for articles, particularly for use within a grading apparatus, and to article carriers therefor.

BACKGROUND ART

Grading apparatus, for example those used for grading fruit, typically comprise at least one conveyor system comprising an endless conveyor belt or chain (hereinafter "conveyor") to which are mounted a plurality of article carriers.

A discharge mechanism is used to unload objects at certain points along the conveyor depending on the results of the grading. Grading may be based on one or more of a number of factors, including weight, shape, colour, ripeness and any other characteristic.

During weighing, the particular article carrier supporting the article to be weighed must be partially disengaged from the conveyor mechanism to the extent that the weight of the carrier and the item it is supporting are supported by a load cell beneath the article carrier, rather than the conveying mechanism. International PCT Publication No. WO2004067417 describes one such article carrier. The article carrier described holds the article above the conveyor, such that it can be discharged onto either side of the chain.

The applicant's International PCT Publication No. WO2014073987, the contents of which are incorporated herein by reference, describes another type of article carrier, in which articles are held on one or both sides of the conveyor on elongate "fingers". The article carrier may work well, but an alternative article carrier which allows even more accurate weighing of articles may be desirable.

For the weight of each article to be ascertained accurately, it is important that only one article carrier at a time bears on any particular weighing means or "load cell". However, this can lead to potential problems, in particular with the type of article carriers described in WO2014073987, when the spacing between the article carriers is relatively small, and the speed of the conveyor is relatively high. Under these circumstances the period during which any one article carrier bears on a weighing means may not be sufficient to allow an accurate measurement.

It is an object of the present invention to address one or more of the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

Further aspects and advantages of the present invention will become apparent from the ensuing description which is given by way of example only.

DISCLOSURE OF THE INVENTION

According to one aspect of the present invention there is provided an article carrier comprising a mounting portion adapted for connection to a conveyor such that when the article carrier is connected to the conveyor the conveyor is positioned on a conveyor axis of the article carrier, the article carrier further comprising first and second carrier portions connected to the mounting portion and configured to allow weighing of one or more articles carried, in use, by the carrier portions;

wherein the first carrier portion comprises a first bearing surface and a second bearing surface, and the second carrier portion comprises a third bearing surface and a spaced apart fourth bearing surface;

wherein a distance between the conveyor axis and any point on one of the bearing surfaces, measured orthogonally to the conveyor axis, is different to a distance between the conveyor axis and any point on any of the other bearing surfaces, measured orthogonally to the conveyor axis.

Preferably the mounting portion is adapted for connection to a conveyor such that when the article carrier is connected to the conveyor the conveyor axis of the article carrier is substantially parallel to a longitudinal axis of the conveyor.

Preferably the first and second bearing surfaces are spaced apart.

Preferably the first and second bearing surfaces are substantially contiguous.

Preferably the first carrier portion is provided on a first side of the conveyor axis and the second carrier portion is provided on a second side of the conveyor axis, opposite the first side.

Preferably the conveyor axis lies on a central plane of the article carrier.

Preferably the article carrier is substantially symmetrical about a central plane which intersects the conveyor axis.

Preferably the article carrier comprises a connecting member rotatably connected to the mounting portion and rotatable relative to the mounting portion about a first axis of rotation, wherein the first carrier portion is rotatably connected to the connecting member and is rotatable relative to the connecting member about a second axis of rotation which is spaced apart from the first axis of rotation;

the carrier portion comprising a rotation limiting portion configured to abut the connecting member to limit rotation of the carrier portion relative to the connecting member;

the article carrier further comprising a connecting member locking means adapted to move between a first position wherein the connecting member locking means is engaged with the connecting member and holds the connecting member in a carriage position, and a second position wherein the connecting member locking means is disengaged from the connecting member, thereby allowing the connecting member to move to a discharge position.

Preferably the connecting member locking means comprises a locking means member which is rotatably connected to the mounting portion.

Preferably a first end of the locking means member is provided with an engagement portion which engages a support surface of the first connecting member.

Preferably the support surface is defined by a wall of a recess provided at one end of the first connecting member.

Preferably a second end of the locking means member comprises a trigger portion.

Preferably movement of the trigger portion away from the mounting portion moves the locking means from the first position to the second position.

Preferably the rotation limiting portion comprises a protrusion or tab which projects into an aperture or recess in the connecting member.

Preferably the first and second carrier portions are shaped as elongate fingers.

According to a second aspect of the invention there is provided an article carrier comprising a mounting portion adapted for connection to a conveyor, a connecting member rotatably connected to the mounting portion and rotatable relative to the mounting portion about a first axis of rotation, a carrier portion rotatably connected to the connecting member and rotatable relative to the connecting member about a second axis of rotation which is spaced apart from the first axis of rotation;

the carrier portion comprising a rotation limiting portion configured to abut the connecting member to limit rotation of the carrier portion relative to the connecting member;

the article carrier further comprising a connecting member locking means adapted to move between a first position wherein the connecting member locking means is engaged with the connecting member and holds the connecting member in a carriage position, and a second position wherein the connecting member locking means is disengaged from the connecting member, thereby allowing the connecting member to move to a discharge position.

Preferably the connecting member locking means comprises a locking means member which is rotatably connected to the mounting portion.

Preferably a first end of the locking means member is provided with an engagement portion which engages a support surface of the connecting member.

Preferably the support surface is defined by a wall of a recess provided at one end of the connecting member.

Preferably a second end of the locking means member comprises a trigger portion.

Preferably movement of the trigger portion away from the mounting portion moves the locking means from the first position to the second position.

Preferably the rotation limiting portion comprises a protrusion or tab which projects into an aperture or recess in the connecting member.

Preferably the first and second carrier portions are shaped as elongate fingers.

According to a third aspect of the invention there is provided a conveyor system comprising:

a conveyor;

a plurality of article carriers mounted to the conveyor, each article carrier comprising at least one carrier portion, each carrier portion comprising a bearing means;

the conveyor system further comprising first weighing means and second weighing means;

wherein the bearing means of a first set of the carrier portions are configured to contact, in use, the first weighing means, but not the second weighing means, and the bearing means of a second set of the carrier portions are configured to contact the second weighing means but not the first weighing means, and wherein the article carriers are mounted to the conveyor such that carrier portions from the first set and the second set are provided alternately along the conveyor.

Preferably each article carrier comprises a carrier portion from the first set and a carrier portion from the second set.

Preferably each article carrier comprises a mounting portion adapted for connection to the conveyor, wherein carrier portions from the first and second sets are provided on the same side of the mounting portion.

Preferably each article carrier comprises a mounting portion adapted for connection to the conveyor, wherein carrier portions from the first and second sets are provided on opposite sides of the mounting portion.

Preferably each article carrier comprises a mounting portion adapted for connection to the conveyor and carrier portions from the first set and the second set are provided on each side of the mounting portion.

Preferably the first weighing means comprises two spaced apart first weighing means contact portions, and the second weighing means comprises at least one second weighing means contact portion.

Preferably the first and second weighing means contact portions are spaced apart along a direction of travel of the conveyor.

Preferably the spacing is such that, in use, the bearing means of one of the first set of carrier portions contacts the first weighing means at substantially the same time as the bearing means of one of the second set of carrier portions contacts the second weighing means.

Preferably each bearing means has a leading edge, and a length of each weighing means contact portion is substantially less than or equal to a distance between the leading edges of successive bearing means of carrier portions from the same set, such that bearing means from only one article carrier at a time are in contact with each weighing means contact portion.

According to a fourth aspect of the present invention there is provided an article carrier comprising a mounting portion adapted for connection to a conveyor such that when the article carrier is connected to the conveyor the conveyor is positioned on a conveyor axis of the article carrier, the article carrier further comprising first and second carrier portions connected to the mounting portion and configured to allow weighing of one or more articles carried, in use, by the carrier portions, the first and second carrier portions both on a first side of the conveyor axis;

wherein the first carrier portion comprises a first bearing surface and a second bearing surface, and the second carrier portion comprises a third bearing surface and a spaced apart fourth bearing surface;

wherein any line parallel to the conveyor axis passes through a maximum of one of the first, second third and fourth bearing surfaces.

Preferably the mounting portion is adapted for connection to the conveyor such that when the article carrier is connected to the conveyor the conveyor axis of the article carrier is substantially parallel to a longitudinal axis of the conveyor.

Preferably the conveyor axis lies on a central plane of the article carrier.

Preferably the first and second bearing surfaces are spaced apart. Alternatively, the first and second bearing surfaces are substantially contiguous.

According to a fifth aspect of the present invention there is provided an article carrier comprising a mounting portion adapted for connection to a conveyor, the article carrier further comprising first and second carrier portions provided on a first side of the mounting portion and configured to allow weighing of one or more articles carried, in use, by the carrier portions;

wherein the first carrier portion comprises a first bearing surface and second bearing surface, and the second carrier portion comprises a third bearing surface and a spaced apart fourth bearing surface;

wherein the first, second, third and fourth bearing surfaces do not overlap when viewed from a front of the article carrier.

Preferably the mounting portion is adapted for connection to the conveyor such that when the article carrier is connected to the conveyor the conveyor axis of the article carrier is substantially parallel to a longitudinal axis of the conveyor.

Preferably the conveyor axis lies on a central plane of the article carrier.

Preferably the first and second bearing surfaces are spaced apart. Alternatively, the first and second bearing surfaces are substantially contiguous.

According to a further aspect of the present invention, there is provided a conveyor system comprising a conveyor and at least one article carrier of the first, second, fourth and/or fifth aspect.

According to a further aspect of the present invention, there is provided a grading apparatus comprising a conveyor system of the fourth aspect and/or and at least one article carrier of the first, second, fourth and/or fifth aspect.

According to another aspect of the invention there is provided an article carrier substantially as herein described with reference to FIGS. 1 to 8 or FIG. 14.

According to another aspect of the invention there is provided a conveyor system substantially as herein described with reference to FIGS. 9 and 10, FIG. 11, FIGS. 12 and 13, or FIG. 14.

The invention may also be said broadly to consist in the parts, elements and features referred to or indicated in the specification of the application, individually or collectively, in any or all combinations of two or more of said parts, elements or features.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

Figure 1:
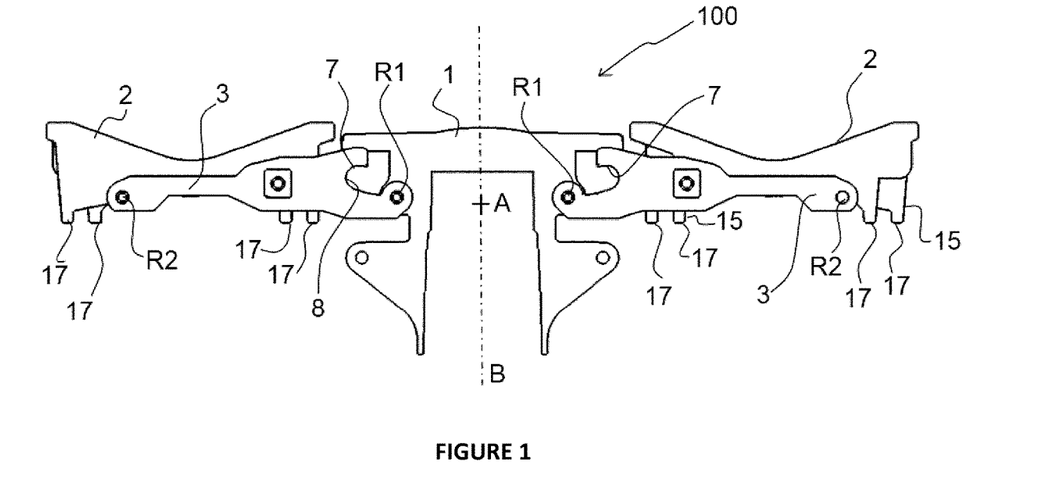
FIG. 1 is a front view of an article carrier of the present invention, with connecting member locking means removed for clarity.
Figure 2:
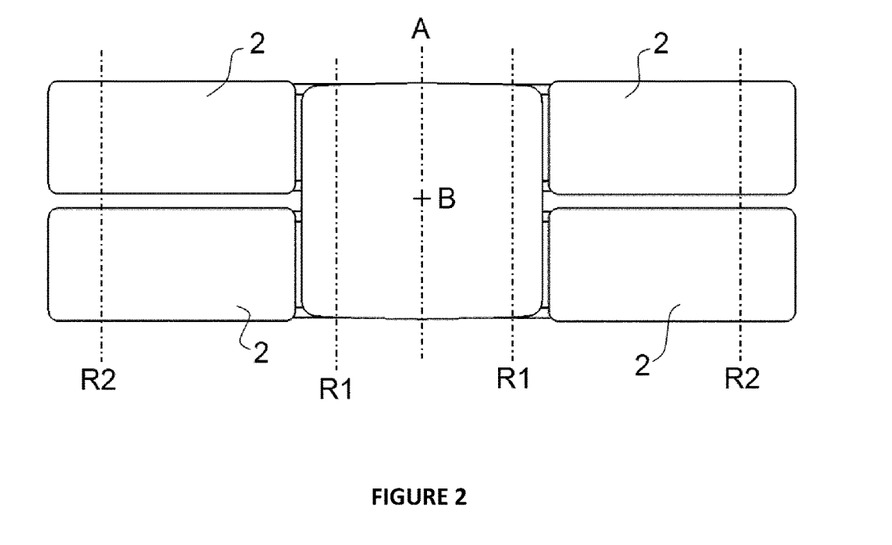
FIG. 2 is a plan view of the article carrier of FIG. 1.
Figure 3:
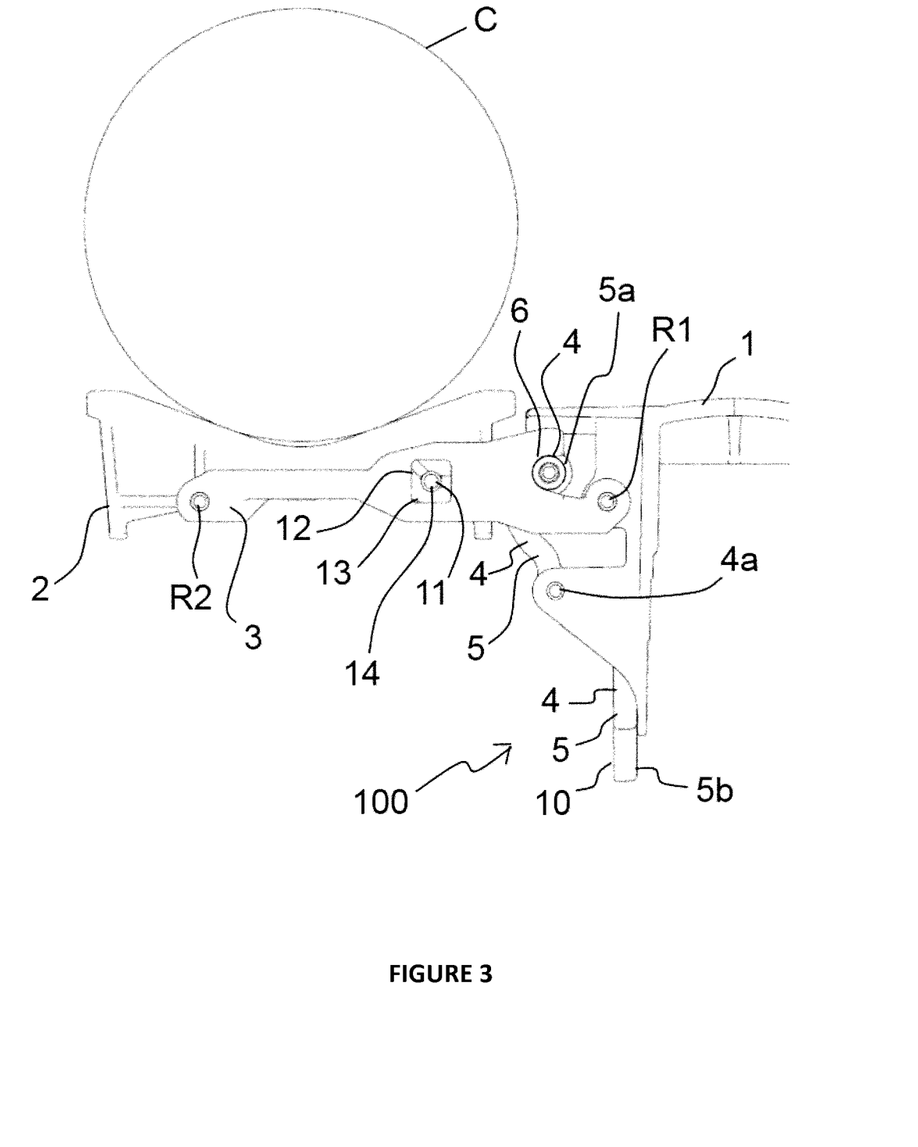
FIG. 3 is a partial front view of the article carrier of FIG. 1 bearing an article in use, with the rear carrier portion not shown for clarity.

Referring first to FIGS. 1-3, an article carrier according to one embodiment of the present invention is generally referenced by arrow 100.

The article carrier 100 comprises a mounting portion 1 for mounting the carrier to a conveyor, for example an endless chain conveyor (not shown), for example by means of a clip or other fastening, such that the conveyor is positioned on a conveyor axis A of the article carrier 100. In preferred embodiments the conveyor axis A is substantially parallel to a longitudinal axis of the conveyor.

One or more carrier portions 2 are mounted to the mounting portion 1. In the embodiment shown the carrier comprises four carrier portions 2, with two carrier portions on either side of the mounting portion 1. However, other embodiments (not shown) may have more or fewer carrier portions on either side of the mounting portion 1, or may have one or more carrier portions 2 on only one side of the mounting portion 1.

In some embodiments the article carrier 100 is substantially symmetrical about a central plane which intersects the conveyor axis A and/or the article carrier comprises an axis B of twofold rotational symmetry, such that the article carrier 100 can be mounted to the conveyor in one of two orientations without affecting the performance of the article carrier 100. The axis of rotational symmetry B preferably intersects the conveyor axis A.

In the embodiment shown the carrier portions 2 are provided as elongate "fingers", and define a bowed or cupped shape in order to securely bear an article C (shown in FIG. 3).

Each carrier portion 2 is connected to the mounting portion 1 by a connecting member 3. The connecting member 3 is rotatably connected to the mounting portion 1 such that it can rotate about a first axis of rotation R1. The carrier portion 2 is rotatably connected to the connecting member 3 such that it can rotate relative to the connecting member 3 about a second axis of rotation R2. The first and second axes of rotation R1, R2 are spaced apart, and in many embodiments are at opposite ends of the connecting member 3.

Figure 4:
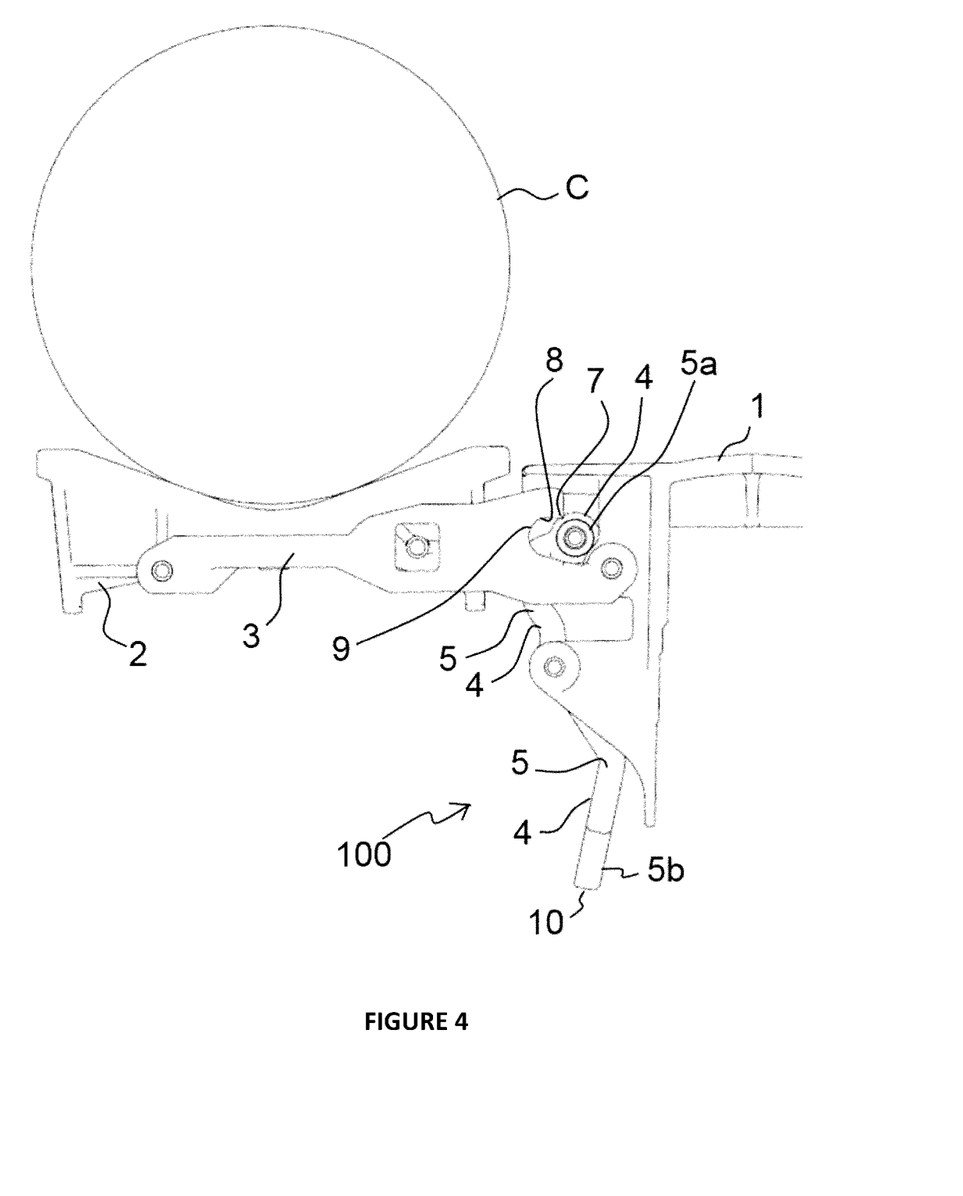
FIGS. 4 to 6 are partial front views of the article carrier of FIG. 1 with the connecting member locking means in a second, disengaged position, and the carrier portion moving from a carriage position to a discharge position. The rear carrier portion is not shown for clarity.
Figure 5:
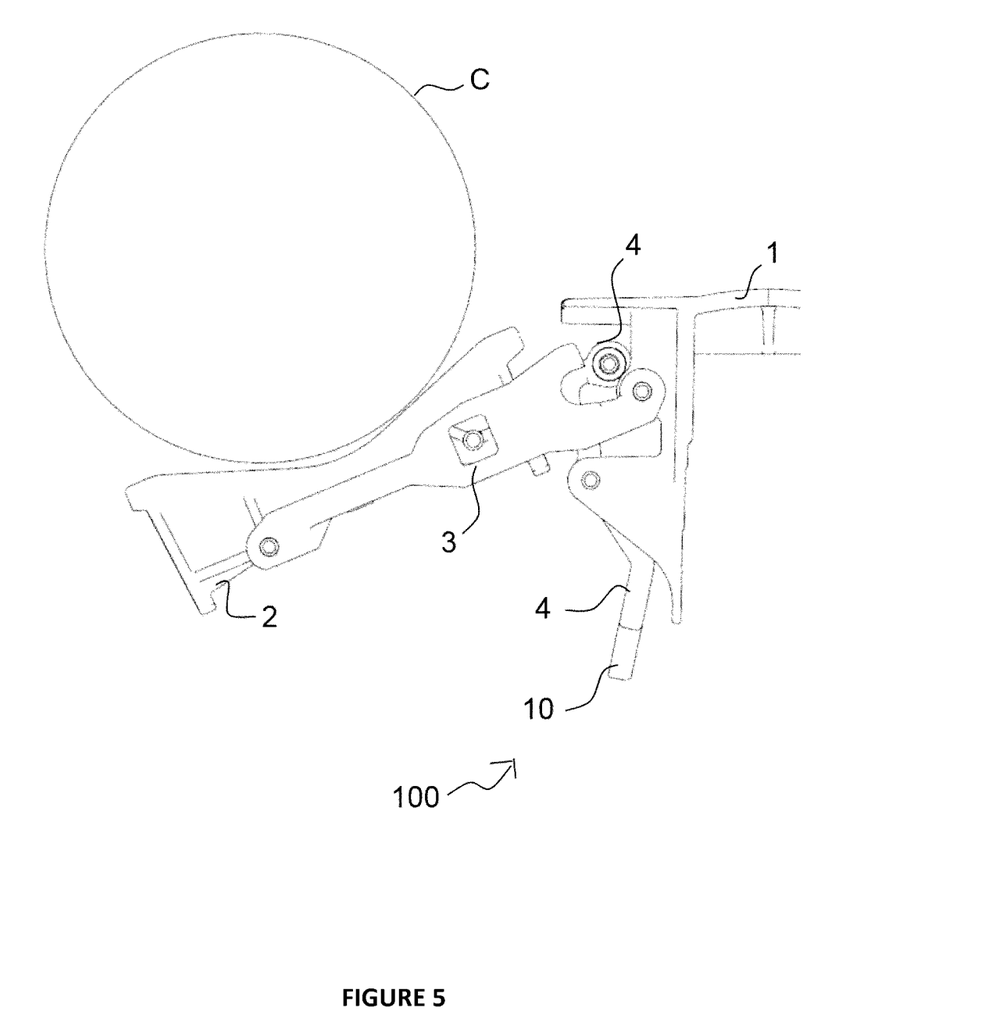
Figure 6:
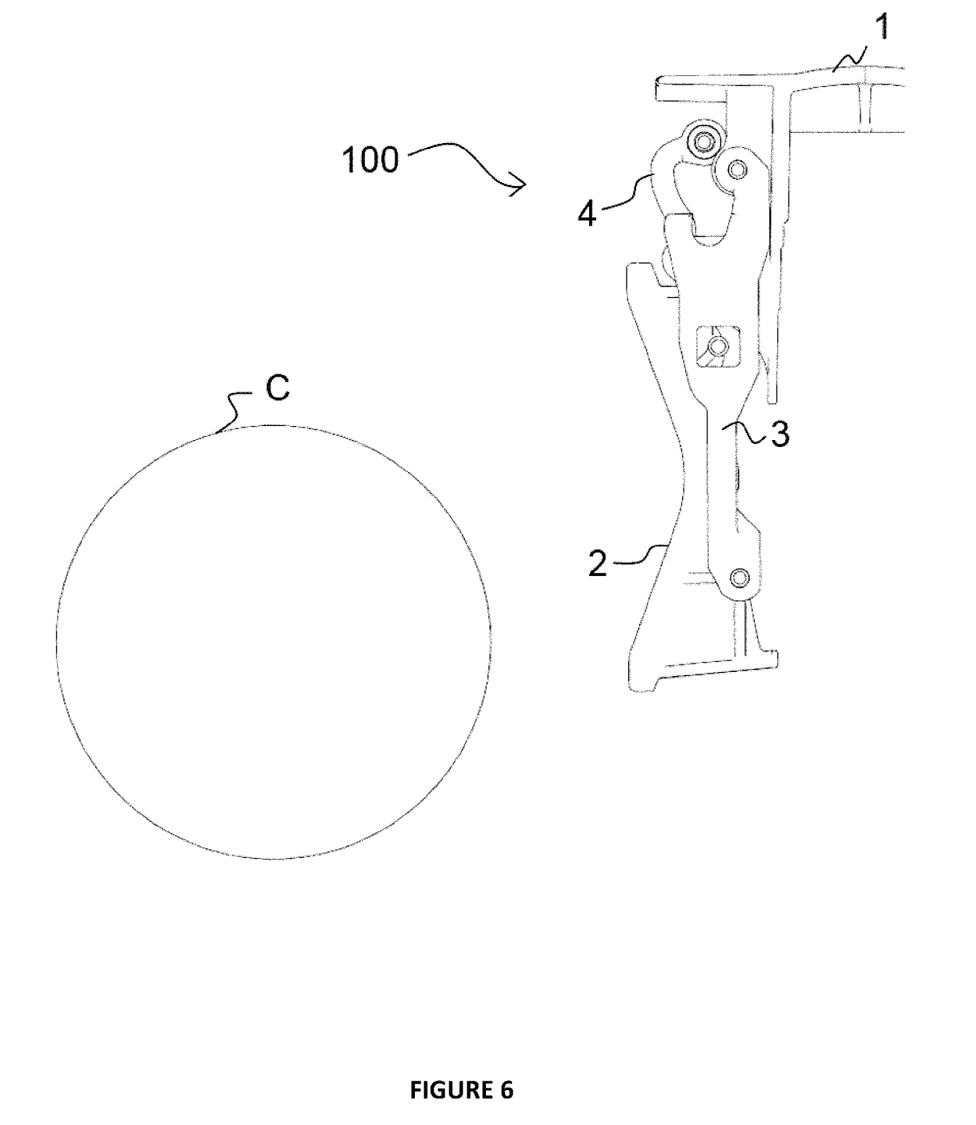

The article carrier 100 is further provided with a connecting member locking means 4. The connecting member locking means 4 is moveable between a first position, shown in FIG. 3, wherein the connecting member locking means 4 is engaged with the connecting member 3 and holds the connecting member 3 in a carriage position, and second position, shown in FIGS. 4-6, in which the connecting member locking means 4 is disengaged from the connecting member 3, thereby allowing the connecting member 3 to rotate about the first axis of rotation R1 and (if no other surface is supporting the carrier portion 2) to move to a discharge position. The connecting member locking means 4 may also be moved to the second, disengaged, position when an item borne by the carrier portion 2 is to be weighed.

The connecting member locking means 4 comprises a locking means member 5 which is rotatably connected to the mounting portion 1. The connection 4a is preferably at a point between the first end 5a and second end 5b of the locking means member 5.

A first end 5a of the locking means member 5 is provided with an engagement portion 6 which engages a support surface 7 of the connecting member 3 (best seen in FIG. 1) when the connecting member locking means 4 is engaged with the connecting member 3. The support surface 7 is preferably defined by a wall 8 of a recess 9 provided at one end of the connecting member 3.

The second end 5b of the locking means member 5 comprises a trigger portion 10. To move the connecting member locking means 4 to the second position, shown in FIGS. 4-6, in which the connecting member locking means 4 is disengaged from the connecting member 3, the trigger portion 10 is moved in a direction away from the mounting portion 1. This may achieved by use of a suitable actuator (not shown) contacting the trigger portion 10, or by movement of the article carrier 100 past a cam surface. In one embodiment the actuator is an electromechanical actuator, although other actuators may be used.

In order to move the connecting member locking means 4 back to the first position, the article carrier 100 may be moved past a suitable cam surface which bears on the opposite side of the trigger portion 10 and moves it in a direction toward the mounting portion 1. Alternatively a suitable actuator may be used.

As best seen in FIG. 3, the carrier portion 2 further comprises a rotation limiting portion 11 configured to abut an abutment portion 12 of the connecting member 3 in order to limit rotation of the carrier portion 2 relative to the connecting member 3 such that an article borne, in use, by the carrier portion 2 will not roll off the carrier portion 2 when the connecting member locking means 4 is engaged with the connecting member 3. In the embodiment shown the interaction of the rotation limiting portion 11 and the abutment portion 12 allows substantially 5° of relative rotation, although in other embodiments more or less relative rotation may be allowed, depending on factors such as the shape of the carrier portion 2.

In the embodiment shown the abutment portion 12 comprises an aperture or recess 13 in the connecting member 3, and the rotation limiting portion 11 comprises a protrusion or tab 14 which projects into the aperture or recess 13.

Figure 7:
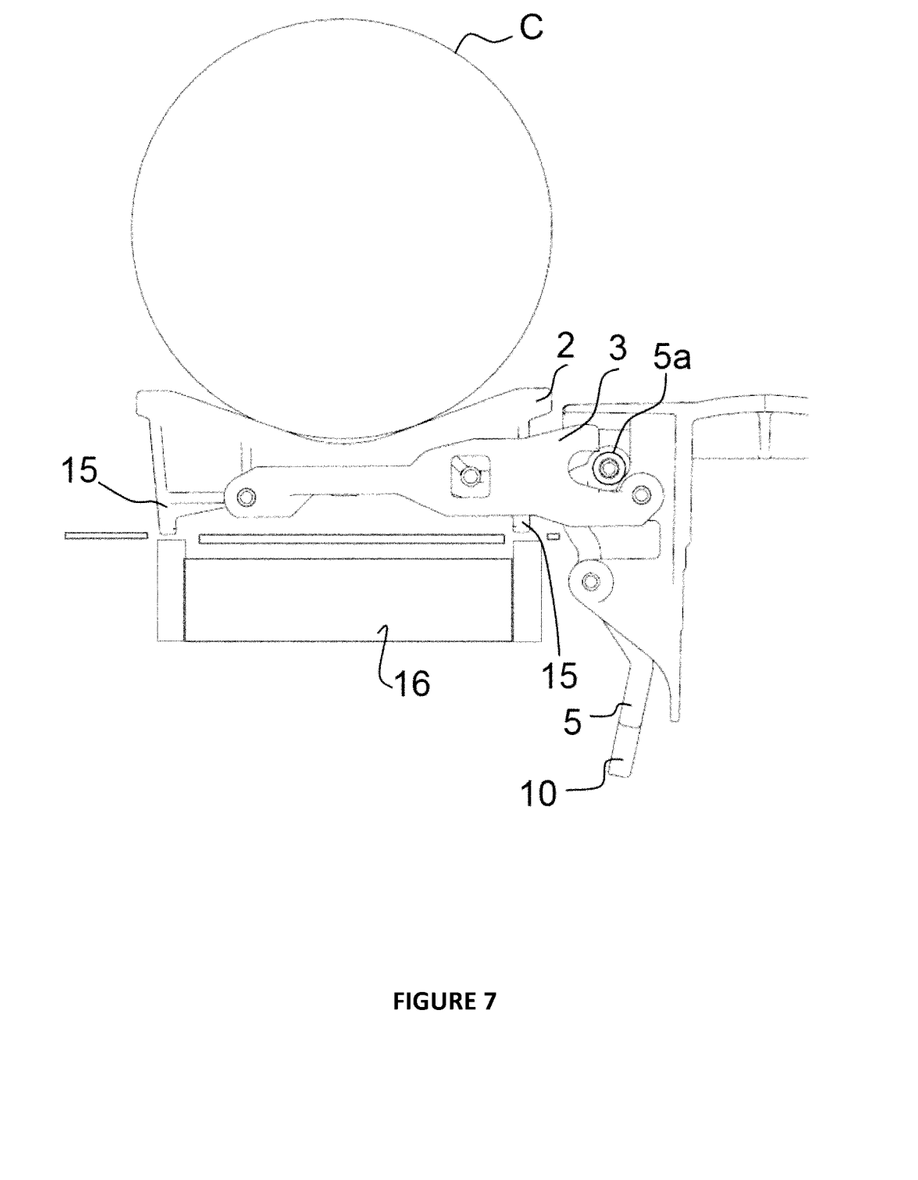
FIG. 7 is a diagrammatic partial cross section through a conveyor system comprising the article carrier of FIG. 1.

Referring next to FIGS. 1, 2, 7 and 8, the article carrier 100 shown comprises four carrier portions 2, two of the carrier portions provided on each side of the article carrier. As best seen in FIGS. 1 and 7, each carrier portion 2 comprises bearing means 15 configured to bear on a weighing means 16 in use, when the article A borne by the carrier portions 2 is to be weighed.

Figure 8:
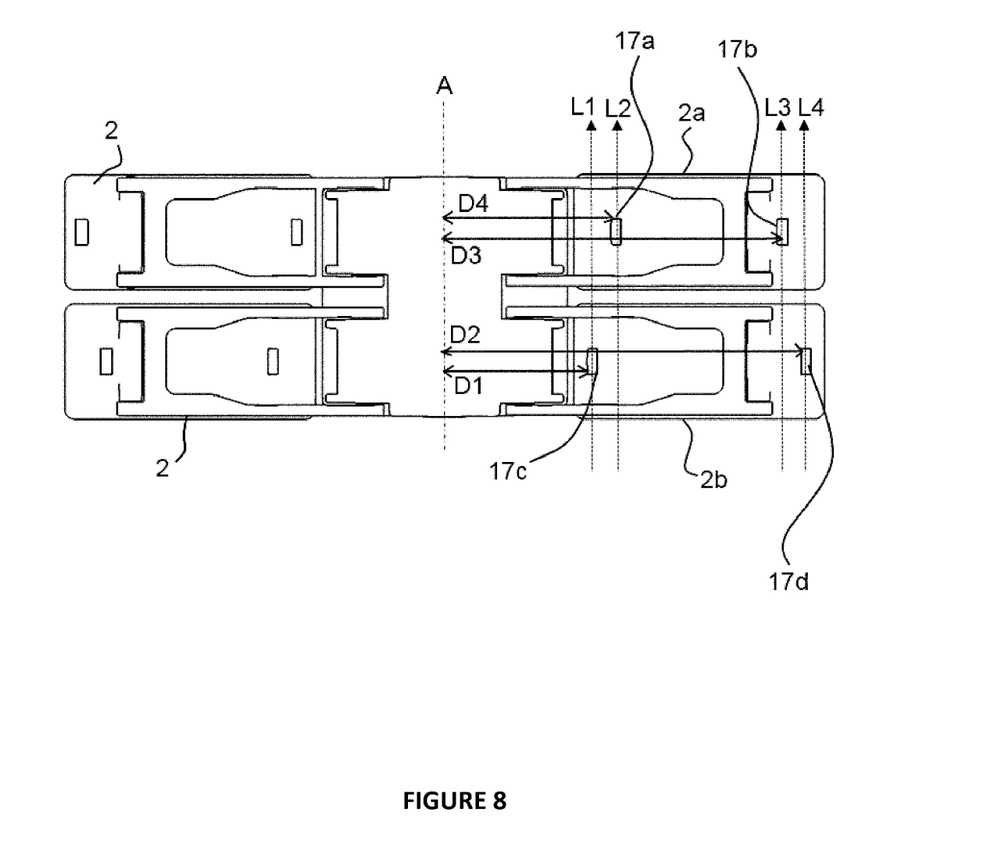
FIG. 8 is a bottom view of the article carrier of FIG. 1.

As best seen in FIG. 1, the bearing means of the carriers 100 are arranged such that the bearing surfaces 17 of the bearing means 15 do not overlap when viewed from a front of the carrier 100. In the embodiment shown in FIGS. 1 and 8, a first carrier portion 2a has a first and second bearing surfaces 17a, 17b, and a second carrier portion 2b, on the same side of the article carrier 100 as the first carrier portion 2a, has third and fourth bearing surfaces 17c, 17d, as best seen in FIG. 8. In the embodiment shown the first and second bearing surfaces 17a, 17b are spaced apart, although in some embodiments they may be substantially contiguous.

The first, second, third and fourth bearing surfaces 17a-17d are arranged such that a distance between the conveyor axis A and any point on one of the bearing surfaces 17a-17d, measured orthogonally to the conveyor axis A, is different to a distance between the conveyor axis A and any point on any of the other bearing surfaces 17a-17d, measured orthogonally to the conveyor axis A. Arrows D1 to D4, shown on FIG. 8, show representative measurements orthogonal to the conveyor axis A.

Arranging the bearing surfaces 17a-17d in this way means that any line parallel to the conveyor axis A passes through a maximum of one of the first, second and third and fourth bearing surfaces 17a-17d. Lines L1 to L4 on FIG. 8 show representative lines parallel to the conveyor axis. As best seen in FIG. 8, in one embodiment the spacing between the first and second bearing surfaces 17a, 17b is less than that between the third and fourth bearing surfaces 17c, 17d. However, in other embodiments (not shown) the spacing may be substantially the same. In this alternative embodiment the first, second, third and fourth bearing surfaces are also arranged such that a distance between the conveyor axis A and any point on one of the bearing surfaces, measured orthogonally to the conveyor axis A, is different to a distance between the conveyor axis A and any point on any of the other bearing surfaces, measured orthogonally to the conveyor axis A, and such that any line parallel to the conveyor axis A passes through a maximum of one of the first, second and third and fourth bearing surfaces.

By arranging the bearing means as described above, a conveyor system can be arranged such that the first carrier means (and any article thereon) can be weighed by a first weighing means at the same time as the second carrier means (and any article thereon) is weighed by a second weighing means. In another embodiment (not shown) a third type of carrier means may also be provided with bearing means (for example provided as downwardly projecting feet with lower bearing surfaces) arranged such that the third carrier means can be weighed by a third weighing means at the same time as the first and second carrier means are weighed by their corresponding weighing means.

Figure 9:
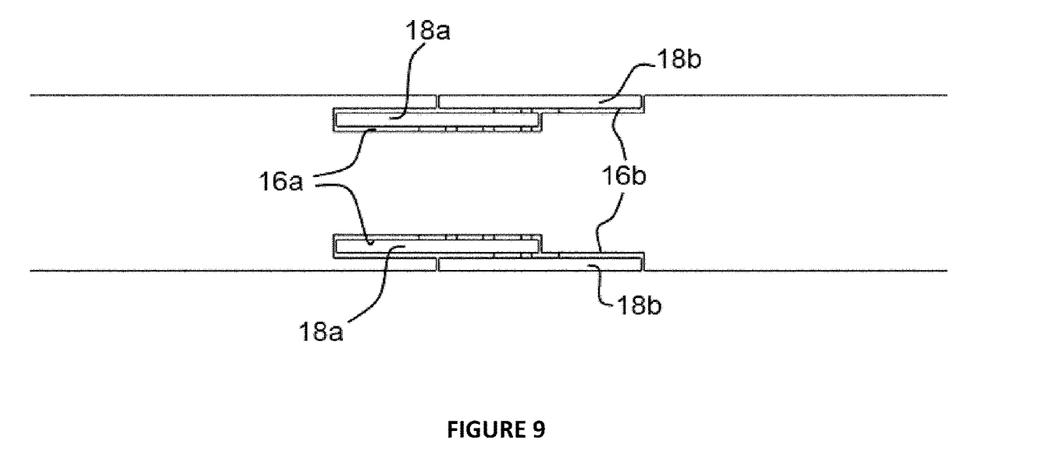
FIG. 9 is a plan view of one side of a conveyor system of the present invention with article carriers and conveyors not shown for clarity.
Figure 10:
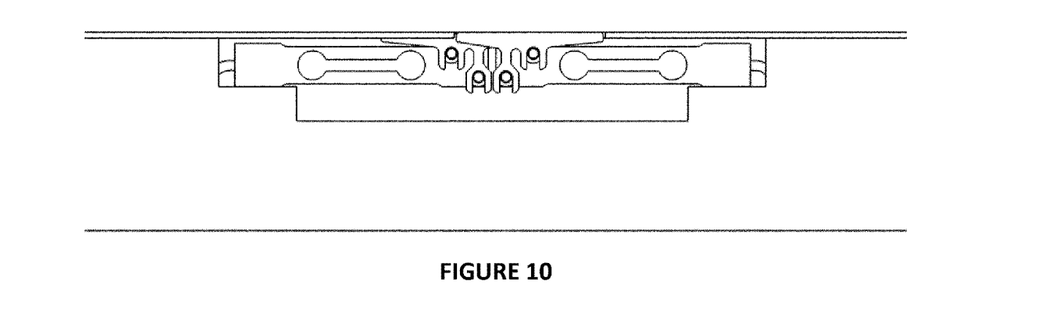
FIG. 10 is a partial side view of a conveyor system of the present invention with article carriers and conveyors not shown for clarity.
Figure 11:
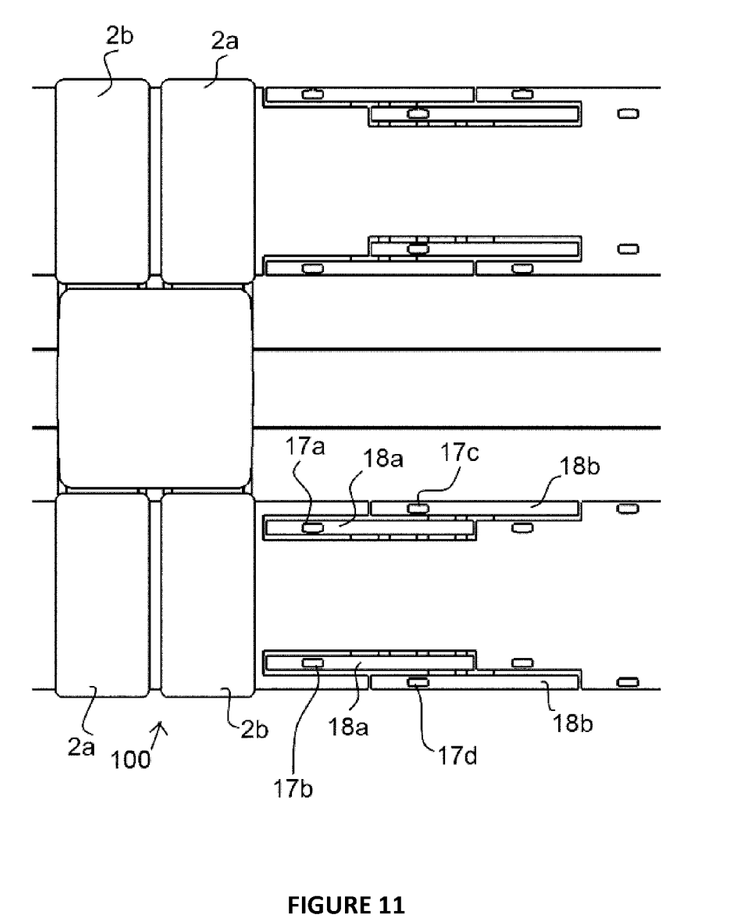
FIG. 11 is a diagrammatic partial top view of a conveyor system of the present invention with a single article carrier of FIG. 1 shown, along with the outline of bearing means surfaces of an adjacent article carrier, but with the conveyor omitted for clarity.

FIGS. 9-11 show a portion of a conveyor system which is provided with first and second weighing means 16a, 16b. Each weighing means 16a, 16b has two weighing means contact portions 18a, 18b which are spaced to contact the bearing surfaces 17 of the carrier portions 2 as they move over the weighing means. The bearing surfaces 17a, 17b of the first carrier portions 2a contact the weighing means contact portions 18a of the first weighing means 16a, but not the weighing means contact portions 18b of the second weighing means 16b, and the bearing surfaces 17c, 17d of the second carrier portions 2b contact the weighing means contact portions 18b of the second weighing means 16b, but not the weighing means contact portions 18a of the first weighing means 16a.

The article carriers 100 are arranged such that the first and second carrier portions 2a, 2b are provided alternately, one behind the other (as viewed in the direction of movement of the conveyor). In this way the length of each weighing means contact portion 18a, 18b can be substantially equal to (or, if required, slightly less than) a distance between the leading edges of bearing means 15 of successive carrier portions of the same type (that is, successive first carrier portions 2a or successive second carrier portions 2b), while ensuring that bearing means 15 from only one article carrier at a time are in contact with each weighing means contact portion. In this way the maximum length of time is allowed for each weighing means to stabilise before or during the recording of a measurement.

In some embodiments (not shown) an upper surface of each carrier portion may be resilient, in order to reduce weighing inaccuracies which may be introduced if the weighing means contact portions 18a, 18b are not set at exactly the correct level. In one embodiment the resilient portion may be overmoulded over an underlying carrier portion frame.

Figure 12:
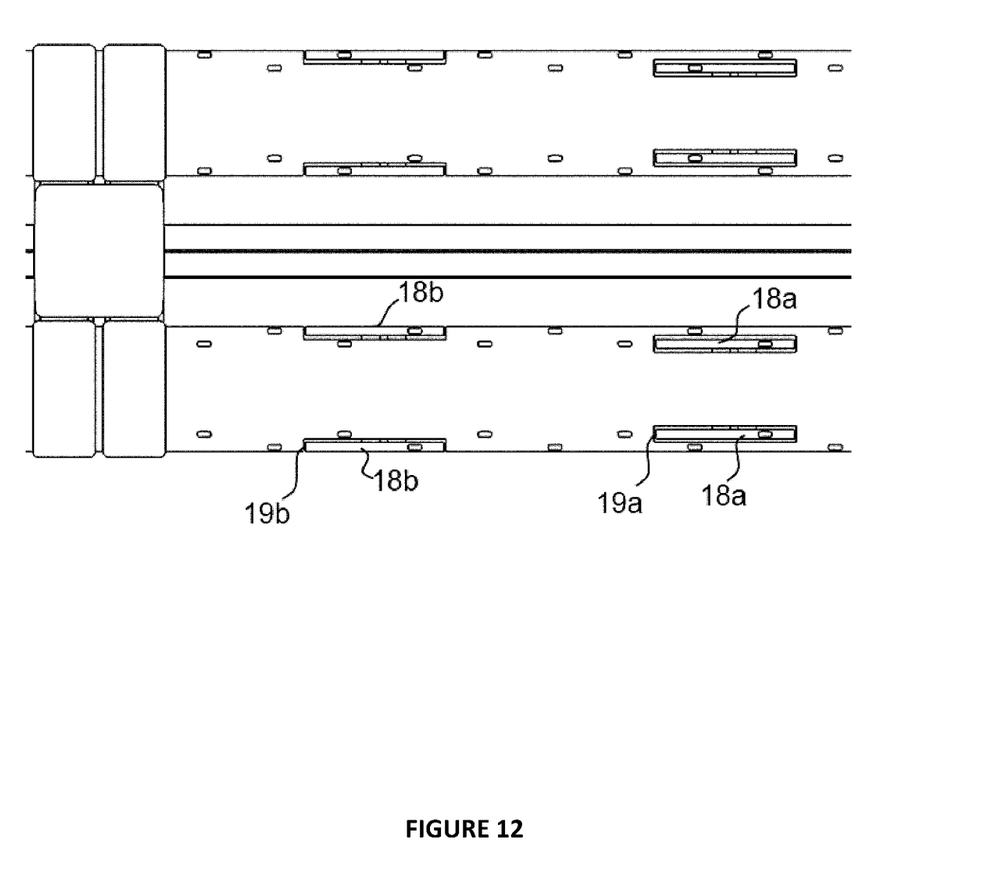
FIG. 12 is a diagrammatic partial top view of a conveyor system of the present invention with a single article carrier of the present invention shown, along with the outline of bearing means surfaces of two adjacent article carriers, but with the conveyor omitted for clarity.
Figure 13:
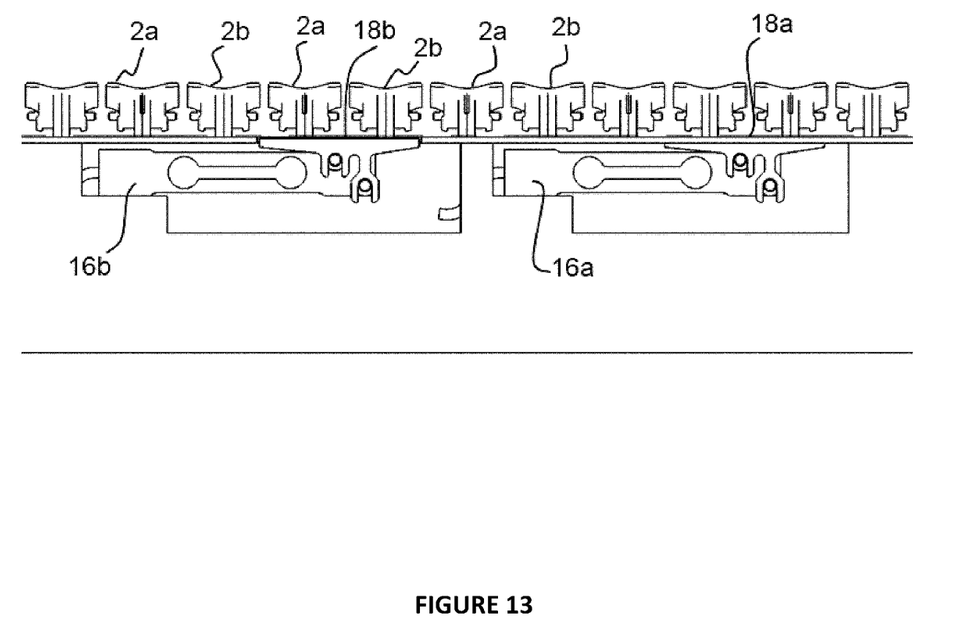
FIG. 13 is a partial side view of a conveyor system of the present invention.

FIGS. 12 and 13 show an alternative embodiment of the conveyor in which the contact portions 18a of the first weighing means 16a do not overlap the contact portions 18b of the second weighing means 16b (in the direction of conveyor travel). In preferred embodiments a leading edge 19a of the contact portion 18a of the first weighing means is spaced apart from the contact portion 19b of the contact portion 18b of second weighing means (in the direction of travel of the conveyor) by a distance substantially equal to a distance between the leading edge of adjacent first and second carrier portions 2a, 2b, such that the bearing surfaces of the first carrier means 2a contact the weighing means contact portions 18a of the first weighing means at substantially the same time as the bearing surfaces of the second carrier means 2b contact the weighing means contact portions 18b of the second weighing means. In this way vibration is reduced during the weighing process.

In some embodiments the article to be conveyed may be elongate, and may extend over three or more carrier portions. In this embodiment (not shown) one or more carrier portions between the carrier portion supporting the front of the article and the carrier portion supporting the rear of the article may be moved to a discharge position prior to the bearing surfaces of the carrier portions contacting the relevant weighing means. By reducing the number of measurements which must be aggregated to calculate the total weight of the article, the weight of the article may be determined more accurately. In one embodiment a vision system, for example as is used to inspect produce, may be used to determine which carrier portions to move to the discharge position.

Those skilled in the art will appreciate that variations of the article carrier 100 shown in FIGS. 1-8 are possible. For example, in one embodiment (not shown) the carrier portions on one side of the conveyor axis A may be omitted, leaving only the two carrier portions 2 on the opposite side.

In another embodiment, two directly opposite carrier portions 2 may be omitted, leaving only one carrier portion 2 on each side of the mounting portion 1. In this embodiment the orientation of every second article carrier may need to be reversed in order to ensure that bearing means from only one article carrier at a time are in contact with each weighing means contact portion.

The article carrier 100 shown in FIGS. 1-8 has a twofold rotational symmetry B, that is, the shape is identical if rotated about a central axis of symmetry by 180°. This means that the article carrier 100 can be attached to the conveyor in either of two orientations. However, this is not essential, and in some embodiments the opposed carrier portions 2 may be of the same type (that is, they may both be first carrier portions 2a or second carrier portions 2b).

Figure 14:
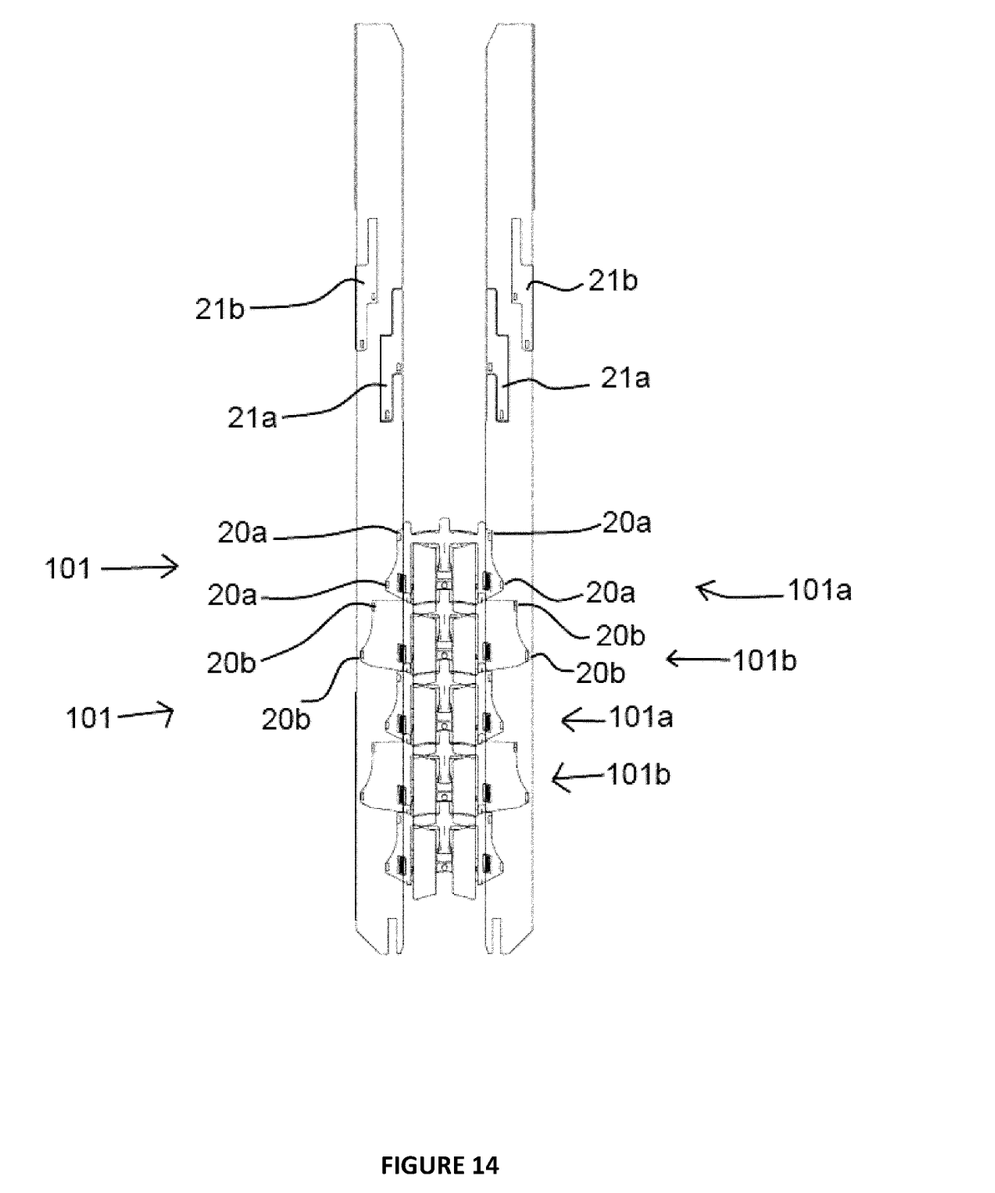
FIG. 14 is a partial top view of a conveyor system according to another embodiment of the invention, with the conveyor omitted for clarity.

Referring next to FIG. 14, an embodiment of the invention is shown with an alternative design of article carrier, generally referenced by arrow 101. In this embodiment the article carriers are similar to those shown in International PCT Publication No WO2004067417. In this embodiment two types of article carrier 101a, 101b are mounted to the conveyor (not shown) alternately. Each article carrier 101 is provided with bearing means comprising four spaced apart feet. The feet 20a from a first set of article carriers 101a are positioned to contact the weighing means contact portions 21a of a first weighing means, but not the weighing means contact portions 21b of a second weighing means, and the feet 20b of the second set of article carriers 101b are positioned to contact the weighing means contact portions 21b of the second weighing means, but not the weighing means contact portions 21a of the first weighing means.

Those skilled in the art will appreciate that many different types of article carrier may be provided with the configuration of bearing means referred to above, not just those shown in the Figures. For example article carriers such as those described in International PCT Publication No. WO2014073987 may be provided with bearing means arranged in accordance with the present invention.

Similarly, some embodiments of article carriers of the present invention may have an arrangement of bearing means such as that known from the prior art, for example from WO2014073987.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

The invention may also be said broadly to consist in the parts, elements and features referred to or indicated in the specification of the application, individually or collectively, in any or all combinations of two or more of said parts, elements or features.

Aspects of the present invention have been described by way of example only and it should be appreciated that modifications and additions may be made thereto without departing from the scope thereof.

What we claim is:

1. An article carrier for use with a fruit or vegetable grading system, the article carrier comprising:
   a mounting portion adapted for connection to a conveyor such that when the article carrier is connected to the conveyor, the conveyor is positioned on a conveyor axis of the article carrier,
   the article carrier further comprising first and second carrier portions connected to the mounting portion on the same side of the conveyor axis and configured to allow weighing of one or more articles carried, in use, by the carrier portions;
   wherein the first carrier portion comprises a first bearing surface and a second bearing surface, and the second carrier portion comprises a third bearing surface and a spaced apart fourth bearing surface;
   wherein a distance between the conveyor axis and any point on one of the bearing surfaces, measured orthogonally to the conveyor axis, is different to a distance between the conveyor axis and any point on any of the other bearing surfaces, measured orthogonally to the conveyor axis; and wherein each carrier portion can be moved from a carriage position to a discharge position independently of each other carrier portion.

2. The article carrier of claim 1 wherein the first and second bearing surfaces are spaced apart.

3. The article carrier of claim 1 wherein the first and second bearing surfaces are substantially contiguous.

4. The article carrier of claim 1 wherein the conveyor axis lies on a central plane of the article carrier.

5. The article carrier of claim 1 wherein the article carrier is substantially symmetrical about a central plane which intersects the conveyor axis.

6. The article carrier of claim 1 wherein the article carrier has an axis of twofold rotational symmetry.

7. The article carrier of claim 6 wherein the axis of rotational symmetry intersects the conveyor axis.

8. The article carrier of claim 1 wherein the first and second carrier portions are shaped as elongate fingers.

9. An article carrier comprising a mounting portion adapted for connection to a conveyor such that when the article carrier is connected to the conveyor the conveyor is positioned on a conveyor axis of the article carrier, the article carrier further comprising first and second carrier portions connected to the mounting portion and configured to allow weighing of one or more articles carried, in use, by the carrier portions;

wherein the first carrier portion comprises a first bearing surface and a second bearing surface, and the second carrier portion comprises a third bearing surface and a spaced apart fourth bearing surface;

wherein a distance between the conveyor axis and any point on one of the bearing surfaces, measured orthogonally to the conveyor axis, is different to a distance between the conveyor axis and any point on any of the other bearing surfaces, measured orthogonally to the conveyor axis;

wherein the article carrier has an axis of twofold rotational symmetry.

10. The article carrier of claim 9 wherein the axis of rotational symmetry intersects the conveyor axis.

* * * * *